US010236016B1

(12) United States Patent
Li et al.

(10) Patent No.: US 10,236,016 B1
(45) Date of Patent: Mar. 19, 2019

(54) PERIPHERAL-BASED SELECTION OF AUDIO SOURCES

(71) Applicant: Amazon Technologies, Inc., Seattle, WA (US)

(72) Inventors: Meng Li, San Francisco, CA (US); Robert Warren Sjoberg, San Francisco, CA (US); Aimee Therese Piercy, Mountain View, CA (US); Robert Franklin Burton, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 14/306,004

(22) Filed: Jun. 16, 2014

(51) Int. Cl.
*G10L 21/06* (2013.01)
*H04R 1/00* (2006.01)
*G10L 21/00* (2013.01)

(52) U.S. Cl.
CPC .............. *G10L 21/06* (2013.01); *H04R 1/00* (2013.01); *G10L 21/00* (2013.01)

(58) Field of Classification Search
CPC ...................................................... G10L 21/00
USPC .......................................................... 704/275
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2004/0176959 | A1* | 9/2004 | Wilhelm ............. B60R 16/0373 704/275 |
| 2006/0252457 | A1* | 11/2006 | Schrager ............. H04M 1/6066 455/556.1 |
| 2007/0005206 | A1* | 1/2007 | Zhang ........................ G06F 3/16 701/36 |
| 2007/0032225 | A1* | 2/2007 | Konicek ........... H04M 1/72513 455/417 |
| 2008/0032663 | A1* | 2/2008 | Doyle .................. H04H 20/106 455/345 |
| 2008/0037727 | A1* | 2/2008 | Sivertsen ................ G10L 15/26 379/88.13 |
| 2010/0031299 | A1* | 2/2010 | Harrang ............. H04N 21/4104 725/80 |
| 2012/0223885 | A1 | 9/2012 | Perez |
| 2012/0329445 | A1* | 12/2012 | Elliott .................. H04W 4/008 455/420 |

(Continued)

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Forrest F Tzeng
(74) *Attorney, Agent, or Firm* — Lee & Hayes, P.C.

(57) ABSTRACT

A speech interface device may be configured to act as a remote speaker peripheral for multiple audio sources such as media players and phones. Upon receiving a request from a user to connect to an audio device, the speech interface device determines which of the multiple audio devices are currently available, selects one of the audio devices based on information about or received from the user, establishes an audio connection with the selected one of the audio devices, and begins acting as a remote speaker or speakerphone for the selected audio device.

19 Claims, 3 Drawing Sheets

(56) References Cited

U.S. PATENT DOCUMENTS

2014/0188483 A1* 7/2014 Hisada .................... G06F 3/165
                                                            704/275
2015/0249882 A1* 9/2015 Patil ........................ G10L 15/26
                                                            381/123

* cited by examiner

PERIPHERAL-BASED SELECTION OF AUDIO SOURCES

BACKGROUND

Audio devices such as media players and smartphones are sometimes used with wireless peripherals such as remote speakers or speakerphone units. To use a wireless peripheral, a user typically interacts with the audio device or audio source to select from different available peripherals. For example, the user may access a configuration screen on a smartphone to connect with and use a remote audio peripheral.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

A speech-based system may use a speech interface device located in the home of a user. The speech interface device may have a microphone and a speaker and may be used to conduct speech interactions and dialogs with a user. In addition, the speech interface device may be used as a remote speaker and/or hands-free audio peripheral for multiple audio sources or devices such as media players, smartphones, and other stationary and portable devices that produce and/or consume audio.

The interface device may be configured for use with multiple audio devices by establishing a communication pairing with each of the multiple audio devices. The interface device and the audio devices may use Bluetooth® communications, and the communications pairings may comprise Bluetooth pairings. Although multiple audio devices may be concurrently paired with the interface device, only a single one of the audio devices at a time is typically connected for communications with the interface device. The interface device is configured to control which of the audio devices is connected at any given time.

As an example, a user may request that the interface device be used with an available audio device. In response, the interface device may determine which of the paired audio devices are currently available. In some cases, more than one of the audio devices may be within range and capable of communicating with the interface device.

After determining which of the paired audio devices are currently available for communications, the interface device selects one of the audio devices, establishes an open audio connection with the selected audio device, and begins acting as a remote audio peripheral such as a remote speaker or hand-free device. When more than one of the audio devices is available, a particular one of the audio devices may be selected depending on the current context within which the interface device is operating, such as which of multiple users is using the interface device, the types of devices that are available, the type of activity the user is requesting, and so forth.

In some cases, the audio device may be selected from multiple available audio devices by identifying the user requesting the connection and selecting an audio device that has previously been specified as being owned by or associated with the identified user. In other cases, the user may explicitly identify the desired audio device by stating a name or designator that has been associated with the audio device.

The described techniques allow control and selection between multiple audio sources or devices by interacting with the interface device or speaker unit, rather than by interacting with each of the audio sources.

Figure 1:
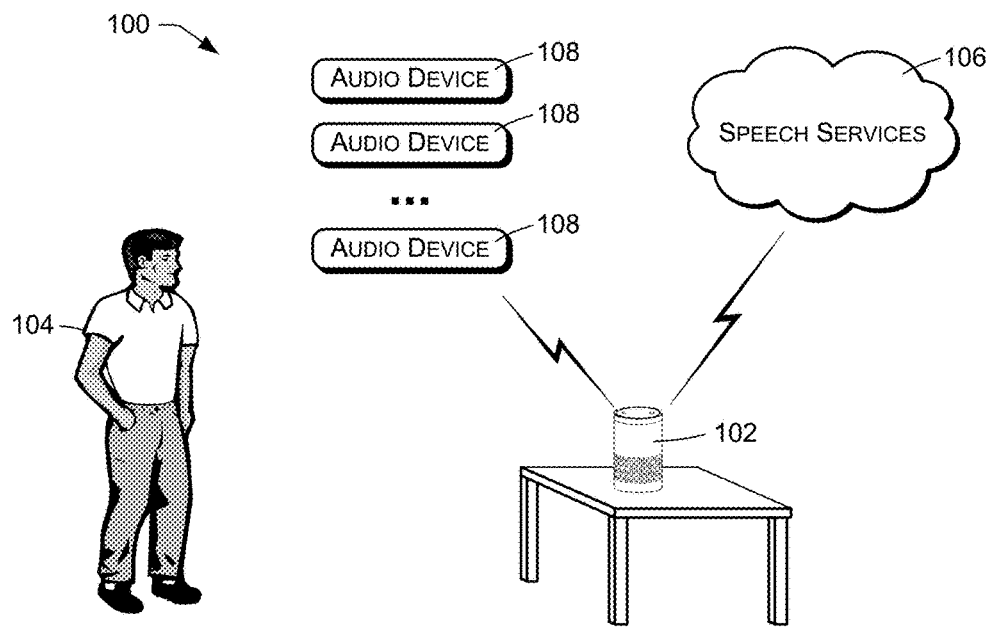
FIG. 1 shows an illustrative speech-based system for use with multiple audio device peripherals.

FIG. 1 shows an illustrative speech-based system 100 that includes an example electronic speech interface device 102 with which a user 104 may interact. In the illustrated implementation, the speech interface device 102 is positioned on a table within a room. In other implementations, it may be placed in any number of locations (e.g., ceiling, wall, in a lamp, beneath a table, under a chair, etc.). Furthermore, more than one speech interface device 102 may be positioned in a single room and different speech interface devices 102 may be positioned in different rooms of user premises.

The interface device 102 may in some embodiments comprise a network-based or network-accessible device having one or more microphones, one or more speakers, and one or more network interfaces or other communications interfaces. For example, the interface device 102 may have a Wi-Fi® interface for wireless wide-area network communications and a Bluetooth® interface for wirelessly communicating with local devices and peripherals.

The speech-based system 100 may include a speech-based service 106 that receives real-time audio or speech information from the interface device 102 in order to detect user utterances, to determine user intent based on the utterances, and/or to perform actions or provide services in fulfillment of the user intent. The speech-based service 106 may also generate and provide speech and other audio for playback by the interface device 102. In some cases, the speech-based service 106 may conduct speech interactions or dialogs with the user 104 using the microphone and speaker capabilities of the interface device 102. A speech dialog may comprise an alternating sequence of user utterances and system speech responses or questions.

The speech-based service 106 may in some embodiments be implemented as a network-based or cloud-based service. Communications between the interface device 102 and the service 106 may use various types of data communications networks, including local-area networks, wide-area networks, and/or the public Internet. Cellular and/or other wireless data communications technologies may also be used for communications. The speech-based service 106 may serve a large number of interface devices, which may be located in the premises of many different users. Furthermore, the speech-based service 106 may represent a collection of services, which may be provided by numerous different servers, components, sources, and/or entities.

The speech-based service 106 may be configured to interact with the user 104 by speech through the interface device 102 to determine a user intent and to provide a function or service in response to or in fulfillment of the user intent. Provided services may include performing actions or activities, rendering media, obtaining and/or providing information, providing information via generated or synthesized speech via the interface device 102, initiating Internet-based services on behalf of the user 104, and so forth.

Functionally, one or more audio streams may be provided from the interface device 102 to the speech-based service 106. The provided audio streams may contain user speech and/or user queries, and may be processed by the speech-based service 106 in various ways to determine the meaning of the user's speech and/or the intent expressed by the query. For example, the speech-based service 106 may implement automated speech recognition (ASR) to obtain a textual representation of user speech that occurs within the audio. The ASR may be followed by natural language understanding (NLU) to determine the intent of the user 104. In some cases, the speech-based service 106 may be configured to perform speaker recognition to determine the identify of a current user based on the voice of the user. The speech-based service 106 may also have command execution functionality to compose and/or implement commands in fulfillment of determined user intent. Such commands may be performed by the speech-based service 106 either independently or in conjunction with the interface device 102, such as by generating audio that is subsequently rendered by the interface device 102. In some cases, the speech-based service 106 may generate a speech response, which may be sent to and rendered by the interface device 102.

The interface device 102 may provide other functions in addition to acting as an interface to the speech-based services 106. For example, the interface device 102 may play music or other audio for the user 104. Music may be obtained from online, Internet sources or from local devices such as personal smartphones and media players that are located in the same premises as the device 102. As another example, the interface device 102 may act as a hands-free speaker or speakerphone for one or more local phones or other communication devices. More generally, the device 102 may be used with multiple local audio devices and/or audio sources 108, which may include personal media players, smartphones, communication devices, laptop computers, tablet computers, audio peripherals, and other audio sources or devices.

In some cases, each of the audio devices 108 may be associated with a respective one of multiple users 104. For example, a household may have multiple users of the interface device 102, where each user has one or more associated audio devices 108. Each user 104 may have a personal phone, a personal media player, and so forth.

The interface device 102 may communicate with the audio devices using a near-field, local, device-to-device, and/or point-to-point communications protocol such as Bluetooth® or other personal-area-networking (PAN) protocols and technologies.

The interface device 102 may be configured for use as an audio interface or peripheral for one or more of the personal audio devices 108. For example, the interface device 102 may be used as a remote speaker for the audio devices 108. As another example, the interface device 102 may be used as a speakerphone or hands-free audio device for an audio device 108 such as a phone or other telecommunications device. When used as a speakerphone, the user speaks into the interface device 102 instead of into the audio device 108 and audio is received from the audio device 108 and played by the interface device 102.

In order to use Bluetooth, a communications pairing or authorization is initially established between the interface device 102 and each of the audio devices 108. Pairing is a process that is initiated manually by a user to configure two devices for future communications between each other. The user may be required to enter a password or passkey for one or both of the Bluetooth devices (such as the interface device 102 and each of the audio devices 108) to ensure that the devices are authorized to communicate with each other. After two devices are paired, they may establish audio or other data communications with each other without further configuration or authorization. An actual communication channel or connection between two previously paired devices may be established automatically whenever devices are in range of each other, or may be made upon user request.

Figure 2:
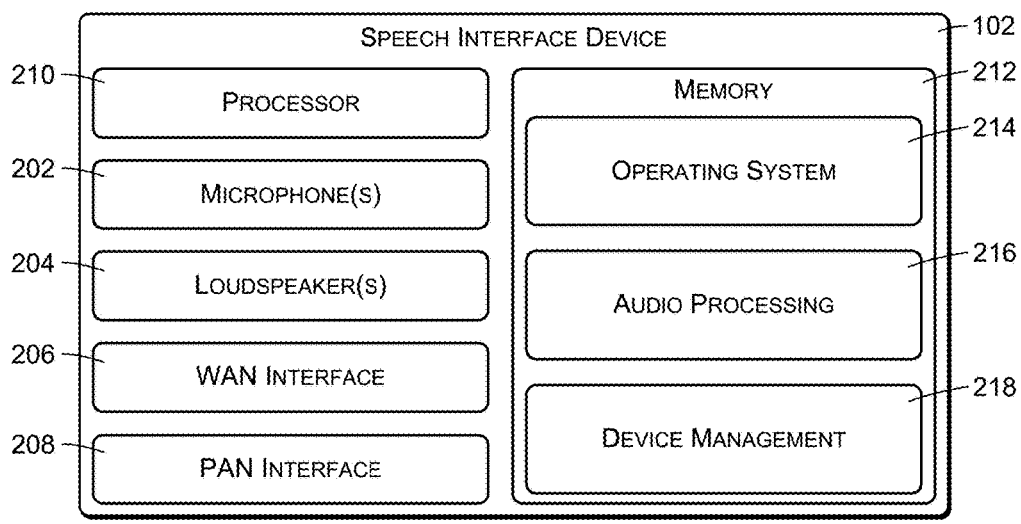
FIG. 2 is a block diagram showing relevant physical and logical components of a speech interface device for use in the system of FIG. 1.

FIG. 2 illustrates relevant logical or functional components of the example interface device 102. The interface device 102 includes one or more microphones 202 and one or more loudspeakers 204. The speech interface device 102 may also have a local-area network (LAN) interface 206 such as a wireless LAN interface, a Wi-Fi® interface, an Ethernet interface, a cellular network interface, or any other communications interface allowing communications with the speech-based services 106. The network interface 206 may be configured to communicate with the speech-based service 106 through a public, wide-area network such as the Internet. The network interface 206 may communicate with or through a local router or access point in some implementations.

The interface device 102 may also have a personal-area network (PAN) communications interface 208 such as a Bluetooth® interface or other wireless, device-to-device peripheral interface. The PAN interface 208 may be configured to pair with multiple audio devices or sources such as media players, smartphones, and so forth.

The interface device 102 may have operational logic, which in many cases may comprise a processor 210 and memory 212. The processor 210 may include multiple processors and/or a processor having multiple cores, and may include digital signal processors. The memory 212 may contain applications and programs in the form of instructions that are executed by the processor 210 to perform acts or actions that implement desired functionality of the interface device 102, including the functionality specifically described herein. The memory 212 may be a type of computer storage media and may include volatile and non-volatile memory. Thus, the memory 212 may include, but is not limited to, RAM, ROM, EEPROM, flash memory, or other memory technology.

The interface device 102 may have an operating system 214 that is executable to manage hardware and services within and coupled to the interface device 102. In addition, the interface device 102 may in some cases include audio processing components 216 for processing input audio signals generated by the microphone 202 and/or output audio signals provided to the loudspeaker 204.

The interface device 102 may include a device management service or component 218 configured to manage the use of multiple local audio device or audio sources that are available for communications through the PAN interface 208. The device management component 218 may establish device pairings with multiple audio devices and may select and connect to certain audio devices in response to user requests.

The speech interface device 102 may include many other components, including other hardware and software components, that are not shown in FIG. 2.

The device management component 218 may be responsible for managing functionality of the interface device 102 relating to the audio devices 108. Generally, the interface device 102 may act as a remote wireless speaker or as a remote hands-free device for any one of the audio devices 108. The interface device 102 may maintain Bluetooth device pairings with multiple audio devices 108, but will perform audio functions in conjunction with only one audio device 108 at a time.

Multiple users within a household may initialize the interface device 102 for use with different personal audio devices. For example, each of multiple users 104 may have a phone and each user may pair their phone with the interface device 102. Some users 104 may also have media players or other devices and may pair these devices with the interface device 102. The interface device 102 associates each paired audio device with a particular user 104.

A user may request for the interface device 102 to be used with or on conjunction with an audio device 108. In some cases, the user request may be general, such as "connect to my phone" or "play music from my device." In response to such a general request, the interface device may respond in different ways, depending on circumstances and the information available to the interface device. Generally, the interface device will (a) identify one or more previously paired audio devices that are currently available for connection and communication, (b) select one of the currently available paired audio devices, (c) establish an open wireless audio connection with the selected one of the currently available paired audio devices, and (d) begin receiving and playing audio from the selected audio device using the open wireless audio connection. In some cases, such as where the audio device is a phone or other telecommunications device, the interface device will be configured to act as a hands-free device for the selected phone. When acting as a hands-free device, the interface device may receive and play audio from the connected audio device and may also capture the voice of the user and provide audio containing the user voice to the connected audio device.

Different audio devices may be available to the interface device at different times. Generally, available devices will include devices that are within a physical distance or wireless coverage range of the interface device, within which device-to-device communications are possible. When using Bluetooth, available devices might comprise devices within the same room or within the same house.

Selecting which of multiple audio devices to use in response to a user request may be performed in different ways, depending on capabilities and configuration of the interface device 102 as well as the situational context. In certain situations, the system 100 may know the identity of a current user and may select an audio device 108 based on the user identity. For example, a user requesting connection to an audio device may be asked to explicitly identify himself or herself. Alternatively, the interface device 102 may be configured to identify a current user by speaker recognition, by recognizing the voice of the user. In some configurations, the system 100 may have photographic or video capabilities allowing facial recognition of the user in addition to speaker recognition.

In some cases, the system 100 may maintain multiple user profiles that indicate different preferences and information regarding corresponding users. Each user profile may indicate one or more of the audio devices 108 that are associated with or that belong to the corresponding user. In response to identifying a user, the system 100 may activate the corresponding user profile. Alternatively, the user may be responsible for explicitly instructing the interface device system 100 to activate a particular user profile.

When the identity or user profile of the current user is known, the interface device may connect with an audio device that has been associated with the user, such as to the phone of the user or to the media player of the user. When more than one audio device is associated with the user, the interface device may select an appropriate device of the user based on the type of activity the user is attempting. For example, the interface device may connect to a media player of the user when the user is attempting to play music and may connect to a telecommunications device of the user when the user is attempting to place a phone call. In other cases, the interface device may attempt to connect to the different devices of a user in an order of priority that has been previously configured by the user.

In certain situations, the particular device selected by the interface device may depend on the content or type of content that has been requested by the user. For example, the user may have requested a particular song, which may be available from only one of the audio devices associated with the user. In a situation such as this, the interface device may be configured to select the audio device that is able to provide the content requested by the user.

Figure 3:
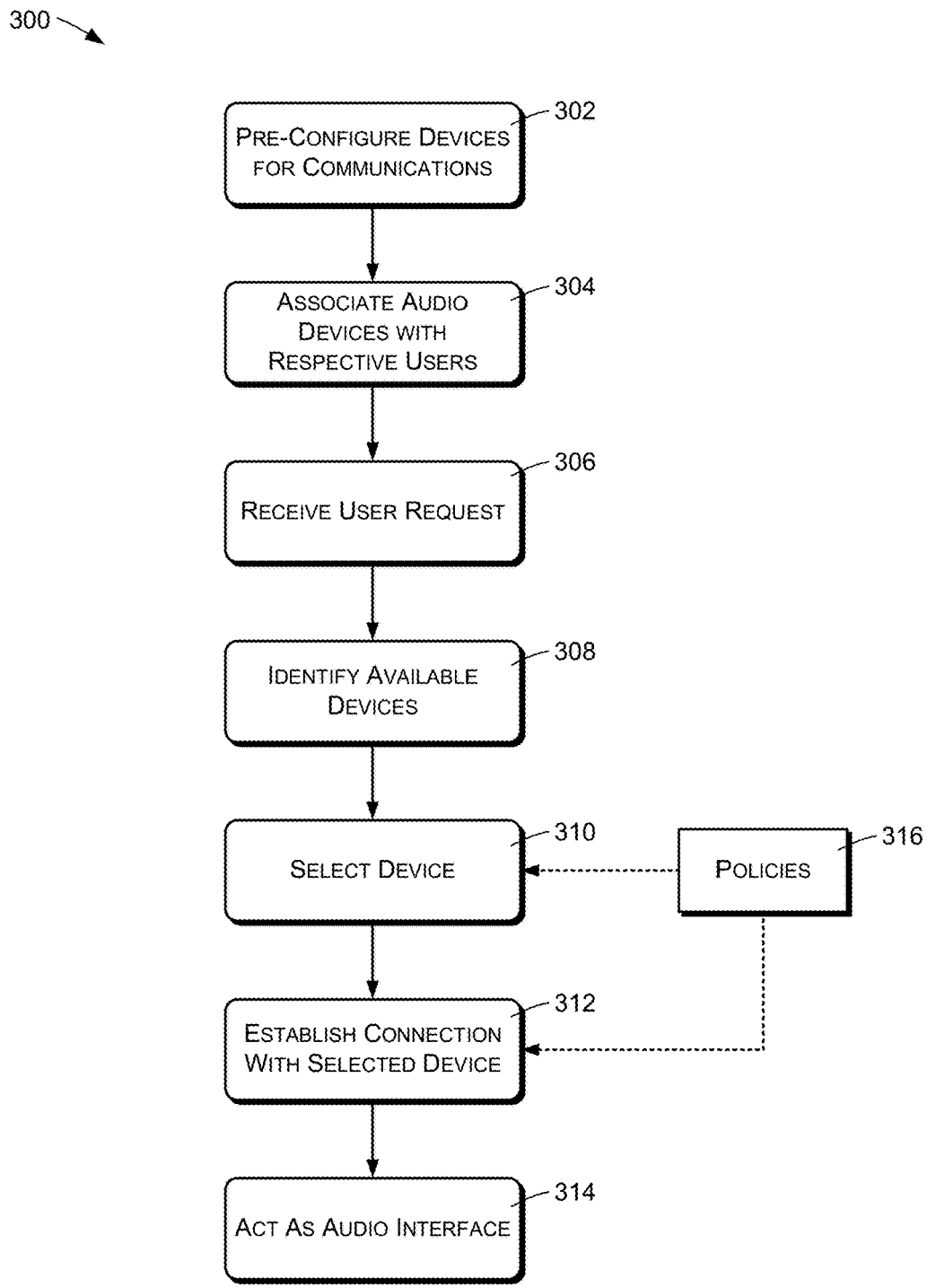
FIG. 3 is a flow diagram illustrating an example method of using the multiple audio device peripherals with the speech interface device.

FIG. 3 illustrates an example method 300 that may be performed by the system 100 in certain embodiments. In the context of the system 100 described above, the described actions may be performed by the interface device 102. In some embodiments, the actions of the interface device 102 may be performed in conjunction with or under the control of the speech-based services 106 or other remote or external supervisory logic.

An action 302 comprises pre-configuring multiple audio devices 108 for communications with the interface device 102. This action may include supplying authorization codes, configuring communication parameters, etc. When using Bluetooth for communications between the interface device 102 and the audio devices 108, the action 302 may comprise establishing communication pairings between the interface device 102 and each of the audio devices 108. Bluetooth pairing may be performed by users of the audio devices 108, by configuring settings of the audio devices 108 and/or providing instructions or commands to the interface device 102. Bluetooth pairing may include exchanging or providing authorization codes to one or both of the paired audio device 108 and the interface device 102.

The audio devices 108 may comprise phones, such as cellular phones, wireless phones, remote handsets, etc. The audio devices 108 may also comprise other types of devices, including audio sources such as media players, radios, and so forth. In some cases, an audio device 108 may be used primarily as a source of audio. In other cases, such as with a smartphone or other telecommunications device, the audio device 108 may provide audio to the interface device 102 and may also receive audio from the interface device 102. In some embodiments, the audio devices 108 may also provide and/or receive other types of media or data, including video.

An action 304 comprises associating each audio device 108 with a respective one of multiple users 104. An audio device 108 may be automatically associated with the user who paired the audio device 108. Alternatively, one or more users may configure the system 100 by specifying which configured audio devices are associated with each user. In many cases, particularly when the audio devices are phones, each audio device will be associated with a single user. However, some types of audio devices, such as media players or other audio sources, may be associated with all users of the system 100 or with a set of multiple users.

The actions 302 and 304 may be performed concurrently or in reverse.

An action 306 comprises receiving a spoken user request to use an audio device. The request may comprise a spoken utterance by the user. The request may in some cases explicitly identify the audio device that the user wishes to use. In other cases, however, the spoken request may not identify any particular audio device. Furthermore, the request to use an audio device may be implicit rather than explicit, such as when a user asks simply to play a certain piece of content such as a song or a type of music. In some cases, the user may explicitly ask to use an audio device, but may not provide any specific identification of the audio device. For example, the user 104 may give the command "connect to phone" or "connect to my audio device," without otherwise specifying or identifying the particular audio device.

An action 308, preformed in response to receiving the user request, comprises identifying multiple previously paired or previously configured audio devices that are currently available for connection. The action 308 may be performed by attempting to communicate with each known or preconfigured device. The number of currently available audio devices may depend on which of the devices are within radio or communication range of the interface device 102.

An action 310, also performed in response to receiving the user request, comprises selecting one of the currently available audio devices for connection. In certain embodiments, the selection of the audio device may be based at least in part on the spoken request, such as on an analysis of the spoken request to determine the identity of the user or to determine an identification of a particular audio device. The action 310 may comprise performing speech recognition on the spoken request to determine which of multiple available audio devices is identified by the user in the spoken request. The action 310 may comprise conducting a speech dialog with the user to receive an explicit identification of the audio device that the user wants to use.

The system may allow users to configure a so-called "friendly" name for each pre-configured audio device. A friendly name might be a descriptive name such as "Charlie's Phone." When requesting connection to an audio device, the requesting user may refer to the audio device by its friendly name. Similarly, the system may enumerate available audio devices by speaking their friendly names, and may ask the user which of the enumerated audio device should be connected.

In certain cases, the audio device may be selected based on its association with an identified user. The action 310 may comprise identifying the user and selecting one of the multiple audio device that is associated with the identified user. In some embodiments, the user may be identified by performing speaker recognition on the spoken request received from the user. In other embodiments, the action 310 may comprise performing speech recognition on the spoken request to identify the user based on information contained in the spoken request. In yet other embodiments, an interactive speech dialog may be conducted with the user to obtain an indication from the user regarding their identity.

As yet another alternative, the user may have been identified during or in conjunction with previous system interactions, using speaker recognition, explicit sign-ins, etc. For example, a user may have previously signed in to the system under a user account or user profile, and the system may identify the user based on the previous sign-in.

In some cases, the request itself may identify the user. For example, a user may explicitly state his or her identity as part of the request. As another example, a spoken request may implicitly identify the user, such as the request "Connect to Dan's phone."

An action 312, also performed in response to receiving the user request, comprises establishing an audio connection with the selected audio device. In certain embodiments, the audio connection may be established using Bluetooth interfaces and protocols. When using Bluetooth, the action 312 may comprise establishing an Advanced Audio Distribution Profile (A2DP) connection with the selected audio device. The action 312 may also, or alternatively, comprise establishing a Bluetooth Hands-Free Profile (HFP) connection with the selected audio device. The action 312 may also, or alternatively, comprise establishing a Bluetooth Audio Visual Remote Control Profile (AVRCP) connection with the selected audio device. Various other types of connections may be established, including various other types of Bluetooth connections and profiles.

An action 314, also performed in response to receiving the user request, comprises acting as an audio interface for the selected and connected audio device. In some cases, this may comprise acting as a remote speaker for the audio device using the speaker of the interface device. Acting as a remote speaker may comprise receiving audio or an audio signal from the connected audio device and playing the audio on the speaker of the interface device. The audio contained by the audio signal may comprise music, for example, and the interface device may play the music as it is received from the audio device.

In other cases, the action 314 may comprise acting as a hands-free audio interface or speakerphone for the selected audio device, using both the microphone and speaker of the interface device. Acting as a hands-free audio interface may comprise (a) receiving near-end audio at the microphone of the interface device, (b) providing the near-end audio to the connected audio device, (c) receiving far-end audio from the connected audio device, and (d) playing the far-end audio on the speaker of the audio device.

Acting as a hands-free interface may include notifying users of incoming phone calls. For example, the interface device 102 may receive a ring notification from a paired phone. In response to receiving the notification, the interface device 102 may announce the ring notification, and may also indicate or identify the particular phone from which the ring notification originated. For example, the interface device 102 may announce "Incoming call on Dan's phone." A user may interact with the system 100 to answer the call using the interface device 102 as a speakerphone.

In some cases, the action 312 of establishing an audio connection with a selected device may involve or include terminating or closing an already existing or open connection. For example, a first audio device may already be connected to the interface device 102 when a user requests that a second audio device be connected. In response to receiving the request to connect with the second audio device, the interface device 102 may terminate an existing open connection with the first audio device. In some cases, the connection with the first audio device may have been established using multiple Bluetooth profiles, such as both HFP and A2DP. In certain embodiments, both the HFP and A2DP connections with the first audio device may be closed, and connections with the second device may be opened using both HFP and A2DP.

AVRCP connections to Bluetooth devices may be used to control playback of content received from connected audio devices such as by allowing the interface device to perform operations such as Next, Previous, Pause, Stop, Play, Fast Forward, Fast Rewind, and so forth. In addition, AVRCP connections allow the system to obtain information regarding content available from different devices. In some cases, this information may be used when selecting from multiple available audio sources, particularly when the user has requested a particular type of content. For example, the user may request particular content or a particular type of content, and the system may limit its selection of devices to those devices that have or are capable of providing the content.

In general, selection of and connection to an available audio device, particularly in response to requests that are vague in terms of the particular audio device that should be connected, may be based on policies 316 that vary dynamically based on context. Context may be defined by the identity of the user, the available audio devices, the type of action that the user is requesting, the content or type of content that the user is requesting, etc. The policies 316 may configured by users, may be based on or learned from previous actions and responses by users, and may be produced based on machine-based learning techniques. For example, results of user dialogs that are performed to clarify user intent may be used in subsequent decisions regarding which of multiple audio devices should be connected, thereby avoiding repeated user dialogs regarding device selection. The policies 316 may be different for different users, for different times of day, for different types of requested content, for different audio devices, etc.

The policies 316 may also specify various different aspects of system behavior. For example, the policies 316 may specify that an active connection that is being used for a phone call cannot be interrupted by music or by a request by another user to connect to a different audio device. The policies 316 may specify types of devices that may be connected, conditions for automatic reconnection, types of devices that are to be used for particular activities, and so forth.

Figure 4:
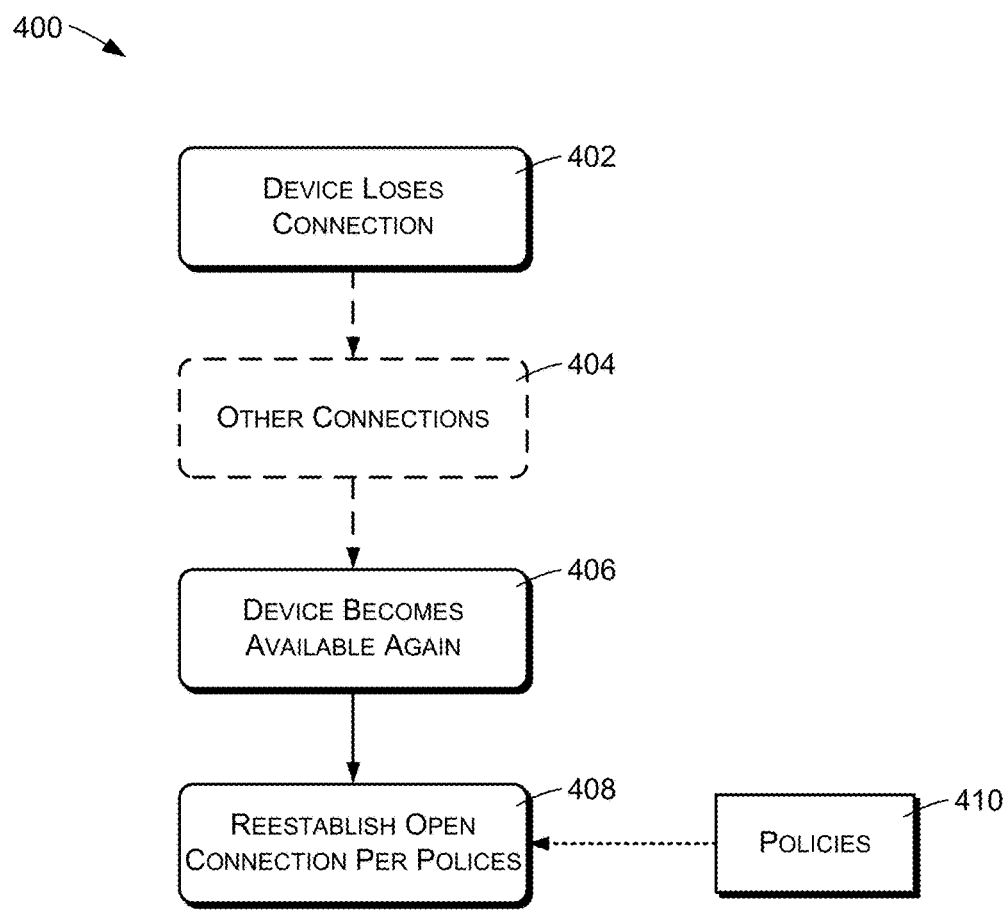
FIG. 4 is a flow diagram illustrating an example method of automatically reconnecting a disconnected audio device.

FIG. 4 illustrates an example method 402 that may be performed by the system 100 to handle disconnections of audio devices due to the audio devices being moved away from the communications coverage area of the interface device. An action 402 comprises losing the open connection with a first audio device. This may happen when a user moves with their audio device to a location that is outside of the wireless coverage area of the interface device.

An action 404 comprises establishing an open connection with a second audio device during the time when the first audio device is outside the wireless communication range of the interface device. An action 406 comprises the first device becoming available again, such as by moving back into the wireless coverage range of the interface device. Note that the action 404 may or may not occur in any given situation. That is, a second device may or may not be connected during the time between when the first audio device is disconnected and the time that it again becomes available. On the other hand, the action 404 may at times include multiple second audio devices being connected and used with the interface device in the interval when the first audio device is not available.

In response to the first device again becoming available, an action 408 is performed of potentially reestablishing an open audio connection with the first device. The action 408 may be performed in accordance with reconnection policies 410 that specify conditions under which the open audio connection with the first audio device is to be automatically reestablished. The policies may be configurable and may vary dynamically based on operating conditions and context. In some embodiments, the policies 410 may specify that the automatic reconnection 408 is to be performed only when there has been no intervening connection 404. As another example, the policies 410 may specify that the automatic reconnection is to be performed only when the first device has been disconnected for less than a specified time limit.

Note that the action 408 of automatic reconnection may be performed with respect to multiple audio devices that have previously been connected with the interface device, not limited to the most recently connected devices. For example, any device that has been previously connected with the interface device may potentially be automatically reconnected in the action 408, depending on the reconnection policies 410.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a microphone;
   a speaker;
   a wireless communications interface configured to establish communication pairings with a first communication device and a second communication device; and
   computer-readable media storing computer-executable instructions that, when executed by the one or more processors, cause the one or more processors to perform actions comprising:
      associating the first communication device with a first identity of a first user;
      associating the second communication device with a second identity of a second user;
      generating, by the microphone, a first audio signal based on sound in an environment of the microphone;
      sending the first audio signal to a speech-recognition service;
      receiving, from the speech-recognition service, data indicating that the first audio signal includes a voice command comprising a request for the wireless communications interface to communicate with a communication device;
      determining that the first communication device and the second communication device are each within a range to the wireless communications interface for establishing a wireless connection;
      determining that a voice associated with the voice command corresponds to the first identity; and
      based at least in part on determining that the voice associated with the voice command corresponds to the first identity, establishing a wireless connection with the first communication device.

2. The system of claim 1, wherein determining that the voice associated with the voice command corresponds to the first identity comprises one or more of:
   performing speaker recognition on the voice command; or
   performing speech recognition on the voice command.

3. The system of claim 1, the actions further comprising:
   capturing near-end sound via the microphone;
   generating a second audio signal representing the near-end sound;

sending the second audio signal to the first communication device;
receiving a third audio signal representing far-end sound from the first communication device; and
outputting the far-end sound represented in the third audio signal on the speaker.

4. The system of claim 1, the actions further comprising:
receiving a second audio signal from the first communication device, wherein the second audio signal represents music; and
playing the music on the speaker.

5. A method, comprising:
receiving a first audio signal representing first sound captured by a microphone of a speech interface device;
sending the first audio signal to a speech-recognition service;
receiving, from the speech-recognition service, data indicating that the first audio signal represents a spoken request for the speech interface device to communicate with a computing device;
determining that a first computing device and a second computing device are each within a range to the speech interface device to establish a wireless connection with the speech interface device, wherein the first computing device is associated with a voice identity of a user;
determining that a voice associated with the spoken request corresponds to the voice identity of the user; and
based at least in part on the voice associated with the spoken request corresponding to the voice identity of the user, establishing a wireless connection between the speech interface device and the first computing device.

6. The method of claim 5, further comprising:
performing speech recognition on the first audio signal to identify a word or phrase included in the spoken request; and
determining that the word or phrase identifies the first computing device.

7. The method of claim 5, further comprising automatically re-establishing the wireless connection with the first computing device after a disconnection.

8. The method of claim 5, wherein the first computing device a phone, the method further comprising:
receiving an indication of an incoming call from the phone; and
outputting, via a speaker associated with the speech interface device, second sound indicating the incoming call, wherein the second sound identifies the phone.

9. The method of claim 5, further comprising closing another wireless connection before establishing the wireless connection.

10. The method of claim 5, further comprising:
establishing a first communication pairing between the speech interface device and the first computing device using a personal area networking protocol; and
establishing a second communication pairing between the speech interface device and the second computing device using the personal area networking protocol.

11. The method of claim 5, wherein establishing the wireless connection comprises one or more of:
establishing a personal area networking Hands-Free Profile (HFP) connection with the first computing device;
establishing a personal area networking Advanced Audio Distribution Profile (A2DP) connection with the first computing device; or
establishing a personal area networking Audio Visual Remote Control Profile (AVRCP) connection with the first computing device.

12. A system comprising:
one or more processors;
a speaker;
a microphone;
a wireless communications interface configured to communicate with a first audio device and a second audio device;
computer-readable media storing computer-executable instructions that, when executed by the one or more processors, cause the one or more processors to perform actions comprising:
generating, by the microphone, a first audio signal representing first sound captured by the microphone;
sending, to a speech-recognition service, the first audio signal representing the first sound captured by the microphone;
receiving, from the speech-recognition service, data indicating the first audio signal represents a spoken request for the wireless communications interface to communicate with an audio device;
determining that the first audio device and the second audio device are associated with a user;
determining that the first audio device and the second audio device are available to establish a wireless connection;
determining the first audio device is associated with a type of the communication represented by the spoken request; and
based at least in part on determining that the first audio device is associated with the type of the communication represented by the spoken request, establishing a wireless connection with the first audio device.

13. The system of claim 12, wherein the first audio device comprises a phone, the actions further comprising acting as a hands-free audio device for the phone using the microphone and the speaker.

14. The system of claim 12, wherein the first audio device comprises a phone, the actions further comprising:
receiving, from the phone, an indication of an incoming call at the phone; and
outputting, via the speaker, a second sound indicating the incoming call, wherein the second sound identifies the phone.

15. The system of claim 12, wherein establishing the wireless connection with the first audio device comprises one or more of:
establishing a personal area networking Hands-Free Profile (HFP) connection with the first audio device;
establishing a personal area networking Advanced Audio Distribution Profile (A2DP) connection with the first audio device; or
establishing a personal area networking Audio Visual Remote Control Profile (AVRCP) connection with the first audio device.

16. The method of claim 5, wherein determining that the first computing device and the second computing device are each within the range to the speech interface device to establish a wireless connection comprises:
determining that the first computing device and the second computing device are each paired to the speech interface device;
sending a first request to communicate to the first computing device; and sending a second request to communicate to the second computing device.

17. The system of claim 1, the actions further comprising:
determining that the wireless connection was disconnected due to the first communication device moving outside of the range;
establishing another wireless connection between the wireless communications interface and the second communication device;
determining that the first communication device moves back into the range;
responsive to the first communication device moving back into the range:
- disconnecting the other wireless connection between the wireless communications interface and the second communication device; and
- re-establishing the wireless connection between the wireless communications interface and the first communication device.

18. The system of claim 1, wherein the range comprises a maximum distance from the wireless communications interface to the first communication device over which a personal area networking protocol signal can be used to communicate.

19. The system of claim 12, wherein:
the type of the communication comprises a phone call; and
determining that the first audio device is associated with the type of the communication comprises determining that the first audio device is a phone.

* * * * *